United States Patent Office 3,284,400
Patented Nov. 8, 1966

3,284,400
PROCESS FOR PREPARING IMPROVED OIL-EXTENDED POLYEPOXIDE COMPOSITIONS AND RESULTING PRODUCTS
Richard C. Nelson, Westport, Conn., and Hans E. Kubitschek, Concord, Calif., assignors to Shell Oil Company, New York, N.Y., a corporation of Delaware
No Drawing. Filed Apr. 5, 1963, Ser. No. 270,822
16 Claims. (Cl. 260—33.6)

This invention relates to a process for preparing oil-extended polyepoxide compositions. More particularly, the invention relates to a process for preparing oil-extended polyepoxide compositions that are particularly suited for use as flooring materials, and to the resulting products.

Specifically, the invention provides a new and efficient process for preparing oil-extended polyepoxide compositions which give cured products having excellent strength and chemical resistance. The new process comprises adding to the oil-extended epoxy composition which is substantially a one phase system, such as, for example, a mixture of a fluid glycidyl ether of a polyhydric phenol and a highly aromatic oil a second oil which has low aromatic content and poor solvent power in sufficient quantity so that the composition on cure is a two phase system.

The invention further provides new oil-extended compositions obtained by the above process which comprises an oil-extended two phase system of epoxy resin and oil wherein the continuous phase is oil-plasticized epoxy resin composition and the dispersed phase is made up of small droplets of oil.

The invention further provides a process for utilizing the above-noted oil-extended compositions as binders for flooring and paving applications or as crack and joint fillers.

There is a growing need in industry for a coating that can be applied to cement floors in factories and storage areas and to roads and other paved areas to make them skid-proof and to prevent them from destruction by chemicals, solvents and vehicular equipment. The problem has been rather difficult as it has been hard to find materials which will adhere to the cement and other surfaces and have the desired resistance to acids and the like and to destructive forces of the trucks, etc.

Epoxy resins have good adhesion to cement and other surfaces and have been found to make good floor and road coatings. These materials, however, are rather expensive and tend to give brittle coatings that have higher coefficients of expansion and therefore cause the concrete substrate to fail. Efforts have been made to solve these difficulties by adding oils to the epoxy coatings. This, however, has raised problems as to the strength and solvent and chemical resistance of the coatings. In addition, many of the extended systems are dark colored and are not pigmentable.

Accordingly, it is an object of the invention to provide new oil-extended polyepoxide compositions. It is a further object to provide new oil-extended polyepoxide compositions which are particularly suited for use in making floor and road coatings and to a special method for their preparation. It is a further object to provide new oil-extended polyepoxide compositions which give cured products having excellent strength, chemical and solvent resistance. It is a further object to provide new oil-extended polyepoxide compositions which give floor and road coatings having excellent impact resistance. It is a further object to provide an extended epoxy flooring system having good trowelability. It is a further object to provide new epoxy-extended systems which are light colored and can be pigmented. It is a further object to provide a new oil-extended composition which is particularly useful as binder for paving applications. These and other objects of the invention will be apparent from the following detailed description thereof.

It has now been discovered that these and other objects may be accomplished by the process of the invention which comprises adding to the oil-extended epoxy composition which is substantially a one-phase system, such as, for example, a mixture of a glycidyl polyether of a polyhydric phenol, a highly aromatic lube oil extract or distillate, a second oil having a low aromatic content and poor solvent power such as a predominantly paraffinic or naphthenic oil in sufficient quantity so that the composition on cure is a two-phase system. It has been found that the new oil-extended systems obtained by this process can be cured rapidly at low temperatures to form coatings having good adhesion to concrete and in addition excellent strength and flexibility. In many cases, for example, it has been found that the addition of the second oil having the poor solvent power has affected a 3-fold increase in strength. In addition, the new coatings after cure have excellent solvent resistance and withstand acids, alkali, and the like. Further, the new coatings have good mar resistance and offer good protection against abuse by vehicular and pedestrial traffic. Finally, when combined with adequate aggregate the new coatings form surfaces having good resistance to skidding.

The above-noted discovery was quite unexpected as one would expect the addition of more oil to the composition would reduce the strength rather than bring about an improvement in strength.

As noted above, the compositions of the invention contain a polyepoxide and two different types of oils. One of the oils is the highly aromatic oil which is compatible with the polyepoxides, extends the resin and forms a one phase system therewith at the desired loading. This type of oil will be referred to herein as the compatible oil. Examples of these compatible oils include the highly aromatic oils such as thermally cracked residues, high boiling fractions of catalytically cracked gas oil, boiling fractions of coking cycle stock, residues from pyrolysis of residual petroleum fuel oils used in the production of gas, and the like. Other examples of this type may be found in Simpson—U.S. 2,906,720.

Other examples of this type of oil include the highly aromatic extracts of distillate oils used in making lube oils. Preferred members of this group include the high boiling extracts obtained by use of non-reactive highly polar, aromatically preferential solvents, such as liquid sulfur dioxide, phenol, cresylic acid, furfural, beta,beta-dichloroethyl ether, nitrobenzene and the like. The use of the so-called double solvent process employing mutually immiscible solvents like cresylic acid and propane also give suitable extracts. Especially preferred are the Edeleanu and furfural extracts of petroleum distillates, e.g., extracts obtained by the use of liquid sulfur dioxide or liquid sulfur dioxide in combination with benzene, etc. The extracts are high-boiling materials which range in general from viscous liquids to thick tar-like materials at ordinary temperatures.

Other examples of aromatic compatible oils include the alkylated phenols, and preferably those containing an alkyl group of 2 to 25 carbon atoms and still more preferably polyalkylated phenols containing at least 5 carbon atoms in each alkyl group.

Coming under special consideration as to the compatible oil are the petroleum derived oils having a high aromatic content, e.g., over 60%, a viscosity-gravity constant above 0.905 and a boiling point above about 300° F. The aromatic content is preferably of the polynuclear and alkylated polynuclear type.

Mixtures of the above-noted compatible oils may also be used. In fact, it is generally preferred to use a mixture of the petroleum derived extracts or distillates with the alkylated phenols wherein the phenols make up from 5 to 40% by weight of the mixture.

The second type of oils employed are the oils which are non-compatible with the polyepoxides (i.e., have poor solvent power therefor) and have a low aromatic content, e.g., aromatic content less than about 30%. These oils are preferably petroleum derived hydrocarbon oils which are chiefly paraffinic or naphthenic and have viscosity-gravity constants below 0.905. Examples of these include the raffinates obtained from the above-noted extraction of distillates used in making lube oils to obtain the highly aromatic extracts. Oils of this second type preferably have aniline points between 50 and 250, and aromatic carbon atoms analysis ($C_A$) between 1 and 30, a naphthenic carbon atom analysis ($C_N$) between 25 and 50, and paraffinic carbon atom analysis ($C_p$) between 30 and 80. Mixtures of these non-compatible oils may also be used.

The polyepoxides to be used in making the compositions of the invention comprise those materials possessing more than one vicinal epoxy group, i.e., more than one vic-epoxy group

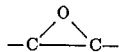

These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in above-noted U.S. 2,633,458 are good examples of polyepoxides of this type. Other examples include the polyglycidyl ether of 1,1,2,2-tetrakis(4-hydroxyphenyl)ethane (epoxy value of 0.45 eq./100 g. and melting point 85° C.), polyglycidylether of 1,1,5,5 - tetrakis(hydroxyphenyl)pentane (epoxy value 0.514 eq./100 g.) and the like and mixtures thereof.

The compositions of the invention may be prepared by any suitable method. The compositions may be prepared, for example, by simply mixing the components together with or without the application of heat. If one or more of the components are very thick liquids, it is generally preferred to use heat before or during the mixing. Various solvents or diluents which will evaporate before or during cure may be added to assist in the preparation of the mixture, but the addition of these materials is not generally desirable as it usually lengthens the time of cure of the finished product. Suitable solvents include hydrocarbons, such as xylene, benzene, alcohols, and the like. It is also convenient in some cases where employing thick polyepoxides to employ some or all liquid polyepoxides, such as normally liquid glycidyl polyethers of polyhydric alcohols as the diluent, or to use monoepoxy diluents, such as butyl glycidyl ether, phenyl glycidyl ether, styrene oxide and the like. In these cases, the diluents are employed in small amounts, such as, for example, 1% to about 15% by weight, and preferably 1% to 5% by weight.

The ratio of the polyepoxide and the mixture of oils to be used will vary depending on the properties desired. Compositions having the above-described unexpected properties, such as good strength, good solvent and chemical resistance and good adhesion, are obtained when the polyepoxide makes up at least 5% and preferably from 15% to 85% by weight of the mixture of oils and polyepoxide.

The ratio of the compatible oil and the non-compatible oil having the low aromatic content may also vary. As indicated above, the amount of the second oil should be sufficient to create the desired degree of the second phase. In general, this is accomplished when the amount of the second oil makes up from about 3% to 40% by weight of the combined mixture of oils. Preferred amounts vary from about 7% to about 20%.

An especially preferred type of composition covered by the present invention include those wherein small inert solid particles are included in the mixture. This is particularly true if the composition is to be used as an overlay for already formed Portland cement or asphaltic concrete surfaces or if the coating is to be used as a non-skid coating. Depending upon the use, the particles may vary in size from about ½ inch to 300 mesh. Preferred materials include sands, finely divided rocks, finely divided shells, crushed quartz or silica, crushed limestone or dolomite aluminum oxide, carborundum, emery, finely divided resinous particles and the like. Particularly preferred are the materials, and especially the siliceous materials, such as, for example, sand and ground rock. Mixtures of various types of particles may also be used.

The amount of the inert particles to be added to the binder composition in forming the non-skid coatings and overlays should be at least 50% by weight of the total mixture and should preferably be between 70% to 95% by weight of the mixture.

The inert particles may be added to the composition before it is applied to the desired surface, or the oil-epoxide mixture may be first applied to the surface and then the inert particles placed over the coating so that they may sink and become embedded in the mixture. Thus, in coating large vehicular surfaces, the oil-epoxy mixture may be applied directly to the road surface and then the inert particles, such as sand, may be sprinkled onto the coating before it is cured.

The compositions of the invention are converted to insoluble infusible products by the action of a curing agent. For this purpose, epoxy curing agents, which may be acidic, neutral or alkaline, are added. Examples of suitable curing agents include, among others, the polybasic acids, such as, for example, the di-, tri- and higher carboxylic acids as oxalic acid, phthalic acid, terephthalic acid, succinic acid, alkyl and alkenyl-substituted succinic acids, tartaric acid, and particularly the polymerized unsaturated acids, such as, for example, those containing at least 10 carbon atoms, and preferably more than 14 carbon atoms, as, for instance, dodecenedioic acid, 10,12-eicosadienedioic acid, tetradecenoic acid, linoleic acid, linolenic acid, eleostearic acid and licannic acid. The polymerization of these acids can be effected by utilizing the lower aliphatic esters of the unsaturated acids so as to prevent decarboxylation during the heating period, and then removing the ester groups through hydrolysis. This process is illustrated in the Industrial and Engineering Chemistry article, page 1139, vol. 38 (1946). The structure of some of the polymerized acids are shown in Industrial and Engineering Chemistry, vol. 33, page 89 (1941). Particularly preferred acids are the trimerized acids, obtained from the ethylenically unsaturated fatty acids as derived from semi-drying and drying oils, and particularly the conjugated fatty acids containing from 12 to 20 carbon atoms. The generic structure of the resulting trimerized acids is believed to be that of the following:

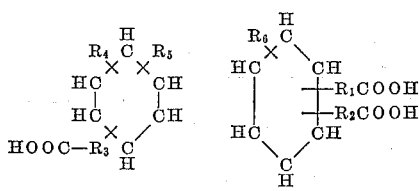

In the above formula, $R_1$, $R_2$ and $R_3$ constitute alkylene radicals having between 4 and 10 carbon atoms each, while $R_4$, $R_5$ and $R_6$ are alkyl radicals having between 4 and 10 carbon atoms each.

Other preferred curing agents include the amino containing compounds, such as, for example, ethylene diamine and higher homologues of same, dicyandiamide, melamine, pyridine, cyclohexylamine, benzyldimethylamine, benzylamine, diethylaniline, triethanolamine, piperidine, tetramethylpiperazine, N,N-dibutyl-1,3-propane diamine, N,N-diethyl-1,3-propane diamine, 1,2-diamino-2-methylpropane, 2,3-diamino-2-methylbutane, 2,3-diamino-2-methylpentane, 2,4-diamino-2,6-dimethyloctane, dibutylamine, dioctylamine, dinonylamine, distearylamine, diallylamine, dicyclohexylamine, methylethylamine, ethylcyclohexylamine, N-aminoethylpiperazine, piperazine, pyrrolidine, 2-methylpyrrolidine, tetrahydropyridine, 2-methylpiperidine, 2,6-dimethylpiperidine, diaminopyridine, tetramethylpentane, metaphenylene diamine and the like, and soluble adducts of amines and polyepoxides and their salts, such as described in U.S. 3,651,589 and U.S. 2,640,037. Still other examples include the acetone soluble reaction products of polyamines and monoepoxides, the acetone-soluble reaction products of polyamines with unsaturated nitriles, such as acrylonitrile, imidazoline compounds as obtained by reacting monocarboxylic acids with polyamines, sulfur and/or phosphorus-containing polyamines as obtained by reacting a mercaptan or phosphine containing active hydrogen with an epoxide halide to form a halohydrin, dehydrochlorinating and then reacting the resulting product with a polyamine, soluble reaction products of polyamines with acrylates, and many other types of reaction products of the amines.

Still other curing agents that may be used include the polycarboxylic acid anhydrides, such as, for example, pyromellitic anhydride, phthalic anhydride, succinic acid anhydride, maleic acid anhydride, boron trifluoride and complexes of boron trifluoride with amines, ethers, phenols and the like, Friedel-Crafts metal salts, such as aluminum chloride, zinc chloride, ferric chloride, and other salts, such as zinc fluoborate, magnesium perchlorate and zinc fluosilicate; inorganic acids and partial esters as phosphoric acid and partial esters thereof including n-butyl orthophosphate, diethyl orthophosphate and hexaethyltetraphosphate and the like.

Another type of curing agent to be employed includes the polyamides containing active amino and/or carboxyl groups, and preferably those containing a plurality of amino hydrogen atoms. Examples of polybasic materials used in making these polyamides include, among others, 1,10-decanedioic acid, 1,12-dodecanedienedioic acid, 1,20-eicosadienedioic acid, 1,14-tetradecanedioic acid, 1,18-octadecanedioic acid and dimerized and trimerized fatty acids as described above. Amines used in making the polyamines include preferably the aliphatic and cycloaliphatic polyamines as ethylene diamine, diethylene triamine, triethylene tetramine, tetraethylene pentamine, 1,4-diaminobutane, 1,3-diaminobutane, hexamethylene diamine, 3-(N-isopropylamino)propylamine and the like. Especially preferred polyamides are those derived from the aliphatic polyamides containing no more than 12 carbon atoms and polymeric fatty acids obtained by dimerizing and/or trimerizing ethylenically unsaturated fatty acids containing up to 25 carbon atoms. These preferred polyamides have a viscosity between 10 and 750 poises at 40° C., and preferably 20 to 250 poises at 40° C. Preferred polyamides also have amine values of 50 to 450.

The amine catalysts, and preferably those containing two or more and preferably 2 to 6 amino hydrogen atoms, are rather unique catalysts particularly when used with the alkylated phenols because more oil appears to be taken into the cured epoxy phase. It is our belief that the amine associates with the alkylated phenol and carries it into the cured system with the epoxy resin.

The compositions of the invention may be utilized for a variety of different applications. They may be used, for example, as crack and joint sealers for already formed surfaces. They may also be used as water-proofing membranes for use over or under other-types of coatings. They may also find use for the treatment of paper or other fibrous materials in forming shingles or construction paper and the like.

The compositions are particularly useful as coating surfaces as noted above. Such surfaces include the concrete, wood, metal, asphalt, and the like. The concrete may be of any of the usual types such as may be prepared from hydraulic cements, such as Portland cement and other types of aluminous and oxy salt cements or asphalt. The asphalt surfaces may be those prepared from straight run asphalts or further refined or modified asphalts. The compositions may be applied in very thin coatings or in very thick coatings. The application to the surfaces may be accomplished in any suitable manner. If the material is thick or contains large amounts of inert particles, the material may best be applied by use of a screed, trowel, shovel or broom. If it is of a more fluid nature, it may be applied by pouring, brushing or spraying or the like. The coatings will generally vary in thickness from about 1 mill to about one inch.

If the compositions of the invention are to be used for certain applications, such as in the laminating of paper, or in applications where a high initial viscosity is desired, it is sometimes desirable to first combine the curing agents, such as polymerized acid, with the polyepoxide while hot for a certain period so as to effect a type of precondensation and then add the oils and other desired additives, such as, for example, aggregate and the like. Some or all of the oils may also be present during this precondensing period.

To illustrate the manner in which the invention may be carried out, the following examples are given. It is to be understood, however, that the examples are for the purpose of illustration and the invention is not to be regarded as limited to any of the specific compounds or conditions recited therein. Unless otherwise specified, parts disclosed in the examples are parts by weight. The polyethers referred to by letter are those found in U.S. 2,633,458.

*Example I*

This example illustrates the preparation of a surfacing composition from Polyether A, a lube oil extract and spray base oil.

38.87 parts of Polyether A defined in U.S. 2,633,458 (glycidyl ether of 2,2-bis(4-hydroxyphenyl)propane was combined with 19.43 parts of dinonylphenol, 24.21 parts of lube oil extract (Shell Dutrex 177) having the following properties:

| | |
|---|---|
| Viscosity SSU/100° F. | 77 |
| Gravity, ° API | 15.8 |
| Flash point, c.o.c.° F. | 300 |
| Aniline point, ° F. | 56 |
| Viscosity-gravity constant | 0.939 |
| Refractive index/20° C. | 1.5388 |
| Molecular analysis, clay-gel percent w.: | |
| Asphaltenes | 0 |
| Aromatics | 72.3 |
| Saturates | 21.2 |
| Polar compounds | 6.5 | and 9.33 parts of a spray base oil (non-compatible with Polyether A) having a viscosity of 60 SSU at 100° F. and an unsulfonated residue greater than 90 (indicating a low aromatic content). This mixture was then combined with 8.16 parts of N-aminoethylpiperazine and the mixture blended together. This mixture was cured at room temperature to form a hard tough casting. Analysis indicated the product was a 2-phase system with most of the oil as the dispersed phase. The product had a tensile strength of 3200 p.s.i., compared to a related composition which did not contain the spray base oil and was one phase which had a strength of only 2230 p.s.i.

In a related experiment, 85% by weight of sand was mixed with 15% of the above binder and the mixture spread out as an overlay for concrete cement walk and allowed to cure at room temperature. The resulting coating was a tough, flexible coating having good strength and good solvent resistance.

Example II 45.87 parts of Polyether A defined in U.S. 2,633,458 was combined with 20.18 parts of dinonylphenol having a mixed aniline point of 4° F. and 20.64 parts of a lube oil extract having the following properties:

| | |
|---|---|
| Viscosity SSU/100° F. | 204 |
| Gravity, ° API | 11.3 |
| Flash point, c.o.c. ° F. | 335 |
| Aniline point, ° F. | 22.5 |
| Viscosity-gravity constant | 0.967 |
| Refractive index/20° C. | 1.563 |
| Molecular analysis, clay-gel percent w.: | |
| Asphaltenes | 0 |
| Aromatics | 80.9 |
| Saturates | 10.1 |
| Polar compounds | 9.0 |

To this was added 8.26 parts of the spray base oil defined in Example I. This mixture was then combined with 5.05 parts of diethylene-triamine and the mixture blended together. This mixture was cured at room temperature to form a hard tough casting. Analysis indicated the product was a 2-phase system with most of the oil as the dispersed phase. The properties at 75° F. are as follows:

| | |
|---|---|
| Tensile strength p.s.i. | 3800 |
| Elongation (percent) | 10 |
| Shore D hardness (10 sec.) | 71 |

In a further experiment, the above mixture before cure was combined with 85% by weight of silica sand and the mixture spread out as an overlay over a cement concrete base and the coating allowed to cure at room temperature. The resulting coating was a tough, flexible coating having good strength and good chemical resistance.

Example III

A polyepoxide adduct of Polyether A and dimerized linoleic acid was prepared by heating 42.86 parts of Polyether A defined above, 17.14 parts of the dimerized linoleic acid and 40 parts of the lube oil extract defined in Example I. 100 parts of the resulting adduct containing epoxy groups was combined with 101 parts of a mixture made up of 6.93 parts N-aminoethylpiperazine, 36.64 parts of dinonylphenol and 56.43 parts of a lube oil raffinate (non-compatible with Polyether A) having the following properties:

| | |
|---|---|
| Viscosity SSU/100° F. | 112 |
| Gravity, ° API | 25.5 |
| Flash point, c.o.c. ° F. | 340 |
| Aniline point, ° F. | 170 |
| Viscosity-gravity constant | 0.862 |
| Refractive index/20° C. | 1.498 |
| Molecular analysis, clay-gel percent w.: | |
| Asphaltenes | 0 |
| Polar compounds | 0.6 |
| Aromatics | 29.4 |
| Saturates | 70.0 |

This mixture was blended together and cured at room temperature. The resulting product was a hard tough and strong casting. Analysis indicated the product was a 2-phase system with part of the oil as the dispersed phase.

In a further experiment, the above mixture before cure was combined with finely divided aggregate and the mixture spread out as an overlay over a cement concrete base and the coating allowed to cure at room temperature. The resulting coating was a tough, flexible, chemical and solvent resistant film which had good skid resistance.

Example IV

Example III was repeated with the exception that the oil used in making the adduct was the lube oil extract defined in Example II. Related results are obtained.

Example V

An adduct of a diglycidyl ester and dimerized linoleic acid was prepared by heating the diglycidyl ester with the dimerized linoleic acid and the lube oil extract as defined in Example III. 100 parts of the resulting epoxy-containing adduct was combined with 101 parts of a mixture made up of 6.93 parts N-aminoethylpiperazine, 36.64 parts of dinonylphenol and 56.43 parts of a lube oil raffinate having the properties as shown in Example III. This mixture was blended together and cured at room temperature. The resulting product was a hard tough and strong casting. Analysis indicated the product was a 2-phase system with part of the oil as the dispersed phase.

In a further experiment, the above mixture before cure was combined with finely divided aggregate and the mixture spread out as an overlay over asphaltic concrete and the coating allowed to cure at room temperature. The resulting coating was a tough, flexible, chemical and solvent resistant film.

The above binder without the aggregrate can also be used as a straight coating for asphaltic and cement concrete bases.

Example VI

The binder free of aggregate as prepared in Example III was used as a joint filler for cracked cement concrete. The cracks were cleaned out, sand poured in to give about ½ inch layer and then the binder poured into the crack and leveled at the top. The binder was allowed to set at ambient temperature for several hours. At the end of that time, the joint filler had set to a hard chemical resistant seal which had excellent adhesion to the cement.

We claim as our invention:

1. A process for preparing oil-extended polyepoxide compositions having improved strength on cure which comprises adding to a mixture of a glycidyl polyether of a polyhydric phenol and a compatible highly aromatic petroleum oil having an aromatic content of at least 60%, another oil which has an aromatic content of less than about 30%, an aromatic carbon atom analysis ($C_A$) between 1 and 30, a naphthenic carbon atom analysis ($C_N$) between 25 and 50 and paraffinic carbon atom analysis ($C_P$) between 30 and 80 and poor solvent power in sufficient quantity so as to form a two-phase cured system, the amount of the glycidyl polyether making up from 15% to 85% by weight of the combined mixture of glycidyl polyether and the two oils, and the oil of low aromatic content making up from 3% to 40% by weight of the combined weight of the two oils.

2. A process for preparing oil-extended polyepoxide compositions having improved strength on cure which comprises adding to a one-phase mixture of a glycidyl polyether of a polyhydric phenol and a highly aromatic petroleum oil compatible with the glycidyl polyether, said oil having an aromatic content of at least 60% and a viscosity-gravity constant above 0.905, a dissimilar oil which is chiefly paraffinic, has a viscosity-gravity constant below 0.905, and has poor solvent power in sufficient quantity so as to form a two-phase cured system, the amount of the glycidyl polyether making up from 15% to 85% by weight of the combined mixture of glycidyl polyether and the two oils, and the dissimilar highly paraffinic oil making up from 3% to 40% by weight of the combined weight of the two oils.

3. A process as in claim 2 wherein the high, aromatic petroleum oil is a high boiling fraction of catalytically cracked gas oil.

4. A process as in claim 2 wherein the highly aromatic petroleum oil is an extract of a distillate oil used in making a lube oil.

5. A process as in claim 2 wherein the highly aromatic oil is an Edeleanu extract of petroleum distillates.

6. A process as in claim 2 wherein the dissimilar oil is a raffinate oil.

7. A composition comprising a mixture of (1) a glycidyl polyether of a polyhydric phenol, (2) a curing agent for the polyepoxide, (3) a highly aromatic petroleum oil having an aromatic content of at least 60%, and (4) a dissimilar oil which is chiefly paraffinic, has an aromatic content of less than about 30%, an aromatic carbon atom analysis ($C_A$) between 1 and 30, a naphthenic carbon atom analysis ($C_N$) between 25 and 50 and paraffinic carbon atom analysis ($C_P$) between 30 and 80, poor solvent power for the epoxy resin and is present in sufficient amount so that the composition on cure forms a two phase system, the amount of the glycidyl polyether making up from 15% to 85% by weight of the combined mixture of glycidyl polyether and the two oils, and the chiefly paraffinic oil making up from 3% to 40% by weight of the combined weights of the two oils.

8. A composition as in claim 7 wherein the curing agent is N-aminoethylpiperazine.

9. A composition as in claim 7 wherein the highly aromatic petroleum material is an extract of a distillate oil used to make lube oils.

10. A composition as in claim 7 wherein the chiefly paraffinic oil is a spray base oil.

11. An oil-extended, cured polyepoxide composition comprising two phases, the continuous phase being a cured oil-plasticized, glycidyl polyether of a polyhydric phenol and the dispersed phase being made up of oil, the oil containing a mixture of highly aromatic petroleum oil having an aromatic content of at least 60% and another oil which has an aromatic content of less than about 30%, an aromatic carbon atom analysis of ($C_A$) between 1 and 30, a naphthenic carbon atom analysis ($C_N$) between 25 and 50 and paraffinic carbon atom analysis ($C_P$) between 30 and 80 and poor solvent power, the amount of the glycidyl polyether making up from 15% to 85% by weight of the combined mixture of glycidyl polyether and the two oils, and the oil of low aromatic content making up from 3% to 40% by weight of the combined weight of the two oils.

12. A process for coating surfaces to give protective overlays thereto comprising applying to the surface a composition comprising a mixture of a glycidyl polyether of a polyhydric phenol, an epoxy curing agent, a highly aromatic petroleum oil having an aromatic content of at least 60%, a dissimilar chiefly paraffinic oil having an aromatic content of less than about 30%, an aromatic carbon atom analysis ($C_A$) between 1 and 30, a naphthenic carbon atom analysis ($C_N$) between 25 and 50 and paraffinic carbon atom analysis ($C_P$) between 30 and 80 and poor solvent power and is present in sufficient amount to effect formation on cure of a two phase cured system, and compacting the coating and allowing it to set hard, the amount of the glycidyl polyether making up from 15% to 85% by weight of the combined mixture of glycidyl polyether and the two oils, and the chiefly paraffinic oil making up from 3% to 40% by weight of the combined weight of the two oils.

13. A process as in claim 12 wherein the coating composition contains an alkylated phenol.

14. A process as in claim 12 wherein the composition contains an aggregate.

15. A composition comprising a mixture of a glycidyl polyether of a polyhydric phenol, an alkylated phenol, a lube oil extract having an aromatic content of at least 60%, a chiefly paraffinic oil having an aromatic content of less than about 30%, an aromatic carbon atom analysis ($C_A$) between 1 and 30, naphthenic carbon atom analysis ($C_N$) between 25 and 50 and paraffinic carbon atom analysis ($C_P$) between 30 and 80, poor solvent power and a viscosity-gravity constant below 0.905, and an amine epoxy curing agent, the amount of the glycidyl polyether making up from 15% to 85% by weight of the combined mixture of glycidyl polyether and the two oils, and the oil which is chiefly paraffinic making up from 3% to 40% by weight of the combined weight of the two oils.

16. An oil-extended, cured polyepoxide composition as in claim 11 wherein the highly aromatic oil is an extract of a distillate petroleum oil, and the oil which has the low aromatic content is a raffinate oil.

References Cited by the Examiner

UNITED STATES PATENTS

| | | | |
|---|---|---|---|
| 2,794,007 | 5/1957 | Taylor | 260—33.6 |
| 3,062,771 | 11/1962 | Boenau et al. | 260—28 |
| 3,156,660 | 11/1964 | Scheibli | 260—28 |

MORRIS LIEBMAN, *Primary Examiner.*

J. E. CALLAGHAN, *Assistant Examiner.*